Sept. 30, 1924.  1,510,328
F. W. MUSSINA ET AL
TRUCK
Filed Aug. 12, 1921
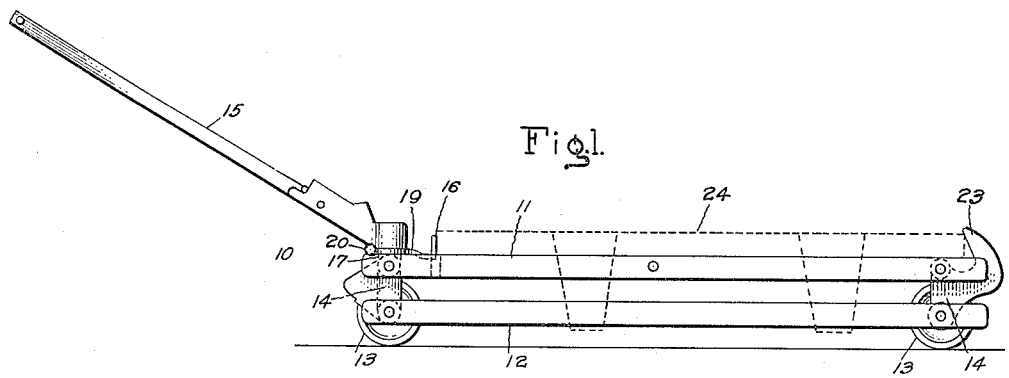
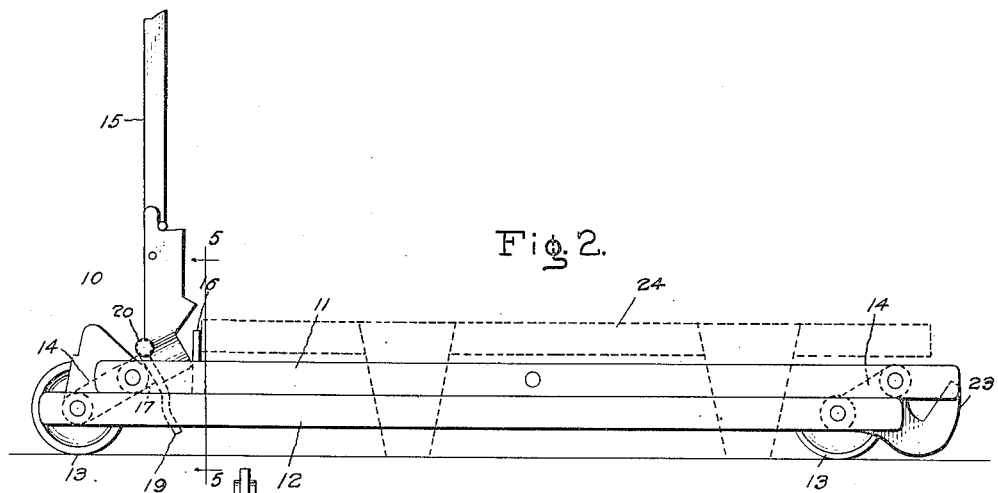
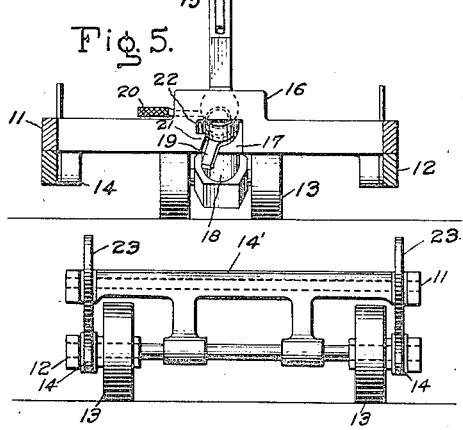
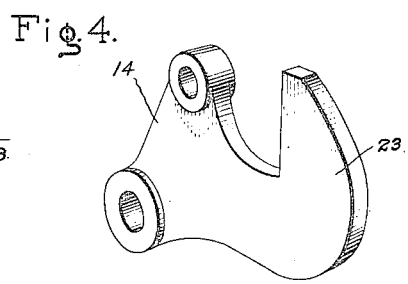
Inventors:
Frederick W. Mussina,
Nicholas J. McMahon,
by Albert G. Davis
Their Attorney.

Patented Sept. 30, 1924.

1,510,328

UNITED STATES PATENT OFFICE.

FREDERICK W. MUSSINA AND NICHOLAS J. McMAHON, OF BALTIMORE, MARYLAND, ASSIGNORS TO GENERAL ELECTRIC COMPANY, A CORPORATION OF NEW YORK.

TRUCK.

Application filed August 12, 1921. Serial No. 491,813.

*To all whom it may concern:*

Be it known that we, FREDERICK W. MUSSINA and NICHOLAS J. McMAHON, citizens of the United States, residing at Baltimore, in the county of Baltimore, State of Maryland, have invented certain new and useful Improvements in Trucks, of which the following is a specification.

This invention relates to improvements in trucks and attachments therefor and has for its object the provision of means for locking the load on the truck.

More specifically this invention relates to that class of trucks which are adapted to be used with a removable loading platform, the truck having a movable frame or rack which can be raised on suitable elevating links after the truck has been moved in position underneath the platform so as to lift the platform and the load thereon from the floor. The load can then be conveyed to the desired place when the truck frame is lowered and the truck removed from under the platform. A great deal of difficulty has been experienced in the use of this class of trucks due to the fact that no means have been provided for locking the load on the truck and it consequently has a tendency to slip or creep particularly when traveling over rough or inclined floors.

In carrying out our invention we provide a hook-shaped member on one or more elevating links at the rear end of the truck which is lowered out of the way when the truck frame is lowered and raised in position to engage the rear end of the load when the truck frame is elevated. By means of our invention the load is thus automatically engaged to prevent slipping when the truck is elevated and released when the truck is lowered.

In the accompanying drawing, Fig. 1 is a diagrammatic view of a truck constructed in accordance with our invention shown in elevated position; Fig. 2 is a diagrammatic view showing the truck in lowered position; Fig. 3 is a rear view showing the truck elevated; Fig. 4 is a perspective view of the elevating link; while Fig. 5 is a section view along the line 5—5 of Fig. 2 looking in the direction of the arrows.

Referring to the drawing, the truck 10 is provided with a movable supporting frame 11 which can be raised and lowered with respect to the body 12 of the truck mounted on wheels 13. The supporting frame 11 is attached to the truck body 12 by means of a plurality of link members 14 upon which the frame can be raised and lowered by the operator by means of the handle 15. The rear end of the truck is also provided with a central link member 14′, as shown in Fig. 3. When in lowered position, the supporting frame rests on the body 12 of the truck. A transverse stop member 16 is secured to the supporting frame near the forward end and projects above the frame.

The front elevating links are connected in a well known manner by a transverse supporting member 17 in which a supporting post 18, having attached thereto the front wheels of the truck, is pivotally mounted. Handle 15 is rigidly secured to post 18. A latch 19 is mounted on post 18 so as to be movable about the axis of the post. The latch is provided with an operating arm 20 extending at right angles thereto. By means of a suitable spring (not shown) latch 19 is biased to the left, as shown in Fig. 5, so as to ride when frame 11 is being raised or lowered on an inclined projection 21 on stop member 16. When the frame is in raised position the latch slips into a notch 22 in the stop member, thus locking the frame in this position. The latch may be released by pressing on arm 20, when it is desired to lower the frame.

The specific means for lifting the frame on the links and locking it in raised position herein shown and described form no part of our invention, and any suitable means may be used in lieu thereof.

The main feature of our invention consists in providing the rear elevating link members 14 with hook-shaped projections 23 forming locking members. These locking members are so constructed with relation to the link members that when frame 11 rests on body 12 with the links in inclined positions, as shown in Fig. 2, the locking members are turned downward below the level of frame 11. When frame 11 is elevated on the link members, as shown in Fig. 1, the link members are moved to substantially vertical position with the result that locking members 23 are swung upward about the lower pivots of their respective links so as to project above frame 11 and engage the load.

In using the truck, the operator lifts handle 15 to lower frame 11 on body 12 and rolls the truck under a loading platform 24 (shown in dotted lines) until stop 16 is engaged, as shown in Fig. 2. The operator then raises the frame 11 on link members 14 by pulling downward handle 15, which acts as a lever, thus lifting the loading platform from the floor, as shown in Fig. 1. Latch 19 engages with notch 22 so as to lock the truck frame in elevated position. As the truck frame is elevated, locking members 23 are automatically swung upward into engagement with the rear of the platform. The load is thus locked securely between the locking members and stop 16 in such manner that it is prevented from slipping or creeping on the supporting frame 11. To remove the truck, latch 19 is released by pressing on arm 20, and frame 11 lowered by lifting handle 15, locking members 23 being swung below the level of frame 11 to release the loading platform and permit the removal of the truck.

It will be observed that we have provided very simple, economical and reliable means for accomplishing the objects of our invention. Obviously various modifications of our invention will occur to those skilled in the art. The locking members 23 may be designed to project above the loading platform so as to lock the same against upward as well as lateral movement.

In accordance with the provisions of the patent statutes, we have described the principle of operation of our invention, together with the apparatus which we now consider to represent the best embodiment thereof, but we desire to have it understood that the apparatus shown is only illustrative and that the invention can be carried out by other means.

What we claim as new and desire to secure by Letters Patent of the United States, is:—

1. A truck comprising a vertically movable frame for lifting and supporting the load, and locking means for the load movably associated with said frame and moved to lock the load by movement of the frame to lift the load.

2. A truck comprising a vertically movable frame for lifting and supporting the load, and a locking member for the load normally below the frame but moved to project above the frame into engagement with the load by movement of the frame to lift the load.

3. A truck comprising a vertically movable frame for lifting and supporting the load, elevating means for said frame, and means carried by said elevating means for automatically locking the load on the frame when the latter is lifted.

4. A truck comprising a vertically movable frame for lifting and supporting the load, elevating link members for said frame, and means carried by said link members for automatically securing the load on the frame when the latter is lifted.

5. A truck comprising a vertically movable frame for lifting and supporting the load, elevating link members for said frame, and hook-shaped members carried by said link members for automatically securing the load on the frame when the latter is lifted.

6. A truck comprising a vertically movable frame for lifting and supporting the load, a stop member secured to said frame, elevating link members for said frame, and hook-shaped members carried by said link members for automatically holding the load against said stop member when the frame is lifted.

In witness whereof, we have hereunto set our hands this 9th day of Aug. 1921.

FREDERICK W. MUSSINA.
NICHOLAS J. McMAHON.